(12) United States Patent
Qingshan et al.

(10) Patent No.: US 8,913,738 B2
(45) Date of Patent: Dec. 16, 2014

(54) APPARATUS WITH WIDEBAND EARPIECE RESPONSE

(75) Inventors: Yao Qingshan, Farum (DK); Preben Kvist, Copenhagen SV (DK)

(73) Assignee: Nokia Corporation, Espoo (FI)

( * ) Notice: Subject to any disclaimer, the term of this patent is extended or adjusted under 35 U.S.C. 154(b) by 1002 days.

(21) Appl. No.: 12/459,379

(22) Filed: Jun. 30, 2009

(65) Prior Publication Data

US 2010/0331058 A1  Dec. 30, 2010

(51) Int. Cl.
*H04M 1/03* (2006.01)
*H04R 1/22* (2006.01)

(52) U.S. Cl.
CPC .................................... *H04M 1/035* (2013.01)
USPC ................... 379/433.02; 455/575.1; 455/566; 455/569.1; 379/433.03

(58) Field of Classification Search
USPC .............. 379/433.03, 433.02; 455/566, 569.1
See application file for complete search history.

(56) References Cited

U.S. PATENT DOCUMENTS

| | | | | |
|---|---|---|---|---|
| 3,798,393 | A * | 3/1974 | Gorike | 381/372 |
| 6,002,949 | A * | 12/1999 | Hawker et al. | 455/569.1 |
| RE37,398 | E | 10/2001 | Nageno | 381/371 |
| 6,324,284 | B1 * | 11/2001 | Hawker et al. | 379/433.02 |
| 6,411,719 | B1 * | 6/2002 | Moster et al. | 381/345 |
| 6,493,456 | B1 * | 12/2002 | Hansson | 381/345 |
| 6,553,119 | B1 * | 4/2003 | Mori | 379/433.11 |
| 6,711,274 | B2 * | 3/2004 | Asahina et al. | 381/386 |
| 6,785,395 | B1 * | 8/2004 | Arneson et al. | 381/334 |
| 7,263,196 | B2 * | 8/2007 | Aubauer et al. | 381/332 |
| 7,499,735 | B2 * | 3/2009 | Murata | 455/575.1 |
| 7,508,933 | B2 * | 3/2009 | Yang | 379/433.02 |
| 7,548,628 | B2 * | 6/2009 | Hawker et al. | 381/355 |
| 8,126,138 | B2 * | 2/2012 | Dinh et al. | 379/433.02 |
| 2004/0071303 | A1 * | 4/2004 | Furuya et al. | 381/182 |
| 2004/0071309 | A1 * | 4/2004 | Furuya et al. | 381/424 |
| 2005/0190941 | A1 * | 9/2005 | Yang | 381/351 |
| 2005/0221867 | A1 * | 10/2005 | Zurek et al. | 455/569.1 |
| 2006/0194618 | A1 * | 8/2006 | Gammon et al. | 455/563 |
| 2011/0255726 | A1 * | 10/2011 | Yu et al. | 381/332 |
| 2012/0128189 | A1 * | 5/2012 | Dinh et al. | 381/332 |

* cited by examiner

*Primary Examiner* — Curtis Kuntz
*Assistant Examiner* — Thomas Maung
(74) *Attorney, Agent, or Firm* — Harrington & Smith

(57) ABSTRACT

Apparatus includes a housing, a substrate provided within the housing and including a first surface oppositely disposed to a second surface, an earpiece speaker module provided within the housing and including an air displacement component that is configured to move upon application of an electrical signal, the air displacement component having a front surface and a back surface, an acoustic cavity defined within the housing, and a front volume adjacent the front surface of the air moving component. The housing includes an earpiece aperture which is coupled to the earpiece speaker module by an acoustic channel, wherein the first surface of the substrate faces generally towards the earpiece aperture. The second surface of the substrate faces the back surface of the air displacement component. A rear volume is provided between the second surface of the substrate and the earpiece speaker module. The acoustic cavity is coupled via a coupling channel to the rear volume. The rear volume and the acoustic cavity are isolated from the front volume.

13 Claims, 6 Drawing Sheets

US 8,913,738 B2

APPARATUS WITH WIDEBAND EARPIECE RESPONSE

FIELD OF THE INVENTION

The invention relates to apparatuses comprising a housing and an earpiece speaker module provided within the housing.

BACKGROUND

Telecommunications terminals, such as mobile or cellular telephones, are known to include a receiver part which has an earpiece for reproducing a downlink or received audio signal.

SUMMARY

According to a first aspect of the invention an apparatus is provided, the apparatus comprising a housing, a substrate provided within the housing and comprising a first surface oppositely disposed to a second surface, an earpiece speaker module provided within the housing and comprising an air displacement component that is configured to move upon application of an electrical signal, the air displacement component having a front surface and a back surface, an acoustic cavity defined within the housing, and a front volume adjacent the front surface of the air moving component, wherein the housing includes an earpiece aperture which is coupled to the earpiece speaker module by an acoustic channel, wherein the first surface of the substrate faces generally towards the earpiece aperture, wherein the second surface of the substrate faces the back surface of the air displacement component, wherein a rear volume is provided between the second surface of the substrate and the earpiece speaker module, wherein the acoustic cavity is coupled via a coupling channel to the rear volume, and wherein the rear volume and the acoustic cavity are isolated from the front volume.

According to a second aspect of the invention a method is provided, the method comprising providing a housing, providing an earpiece aperture in the housing, providing an earpiece speaker module, comprising an air displacement component that is configured to move upon application of an electrical signal, the air displacement component having a front surface and a back surface, within the housing, providing a substrate, comprising a first surface oppositely disposed to a second surface, within the housing such that the first surface of the substrate faces generally towards the earpiece aperture, such that the second surface of the substrate faces the back surface of the air displacement component, and such that a rear volume is provided between the second surface of the substrate and the earpiece speaker module, defining an acoustic cavity within the housing, providing a coupling channel to couple the acoustic cavity to the rear volume, and isolating the rear volume and the acoustic cavity from the front volume.

In this specification, the term "earpiece speaker module" is used to denote an acoustic transducer provided within a device and adapted for providing acoustic signals to a user's ear when the device is located adjacent a user's ear. The earpiece speaker module may be adapted solely for providing acoustic signals to a user's ear when the device is located adjacent a user's ear. Alternatively, the earpiece speaker module may be adapted for use as a combined earpiece speaker and hands-free loudspeaker module.

The substrate may comprise a printed wire board (PWB), a printed circuit board (PCB), or any other suitable medium upon which electrical components can be mounted.

DETAILED DESCRIPTION OF THE EMBODIMENTS

Figure 1A:
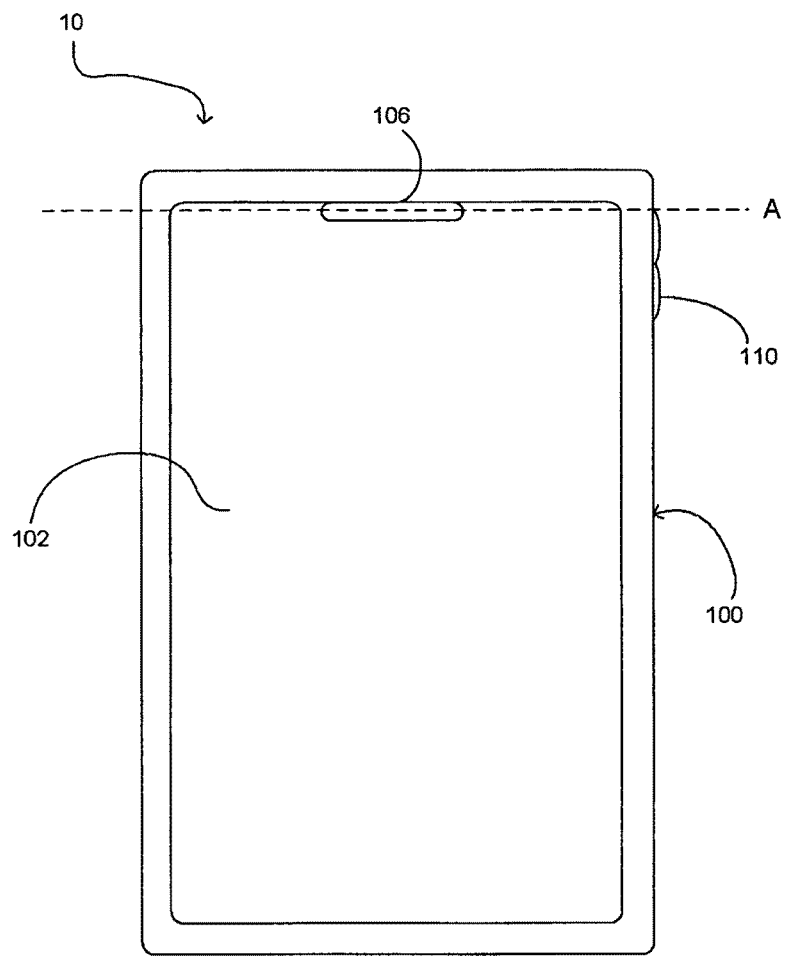
FIG. 1A is a plan view of a mobile terminal 10 according to example embodiments of the invention.

FIG. 1A is a plan view of a mobile terminal 10 according to example embodiments of the invention. The mobile terminal 10 comprises an outer cover 100 which houses internal components (not visible) of the mobile terminal 10. The outer cover 100 comprises a display region 102 through which a display panel 104 (shown in other figures) is visible to a user. The outer cover 100 also comprises, near one longitudinal end, a sound hole 106. When the sound hole 106 is placed adjacent to a user's ear, sound generated by an earpiece speaker module 108 (shown in other figures) is audible to the user. The mobile terminal 10 also comprises a volume control button 110 with which the user can control the volume of an output of the earpiece speaker module 108.

Figure 1B:
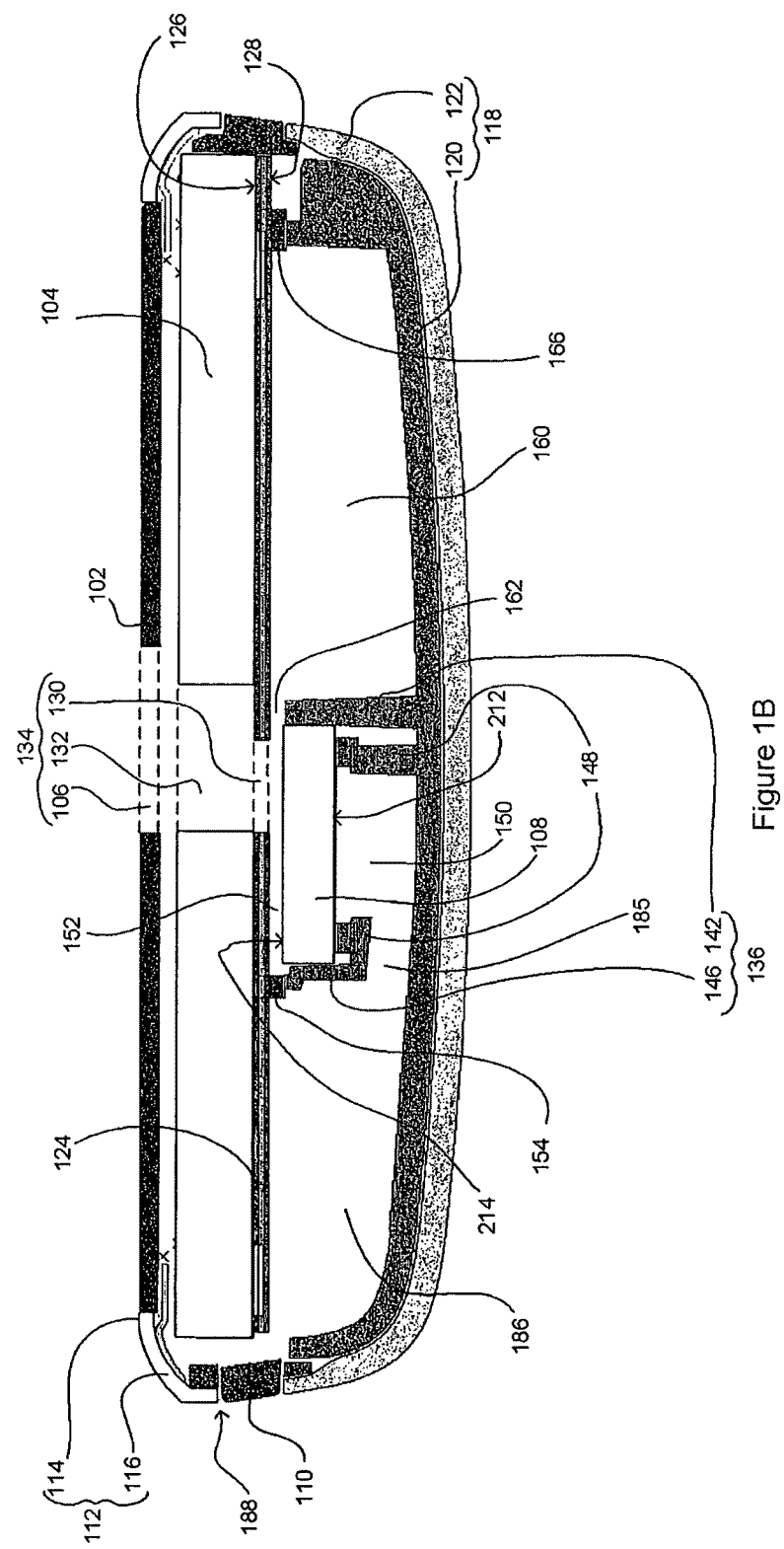
FIG. 1B is a cross-sectional view through the mobile terminal of FIG. 1A at the dashed line denoted "A"
Figure 1C:
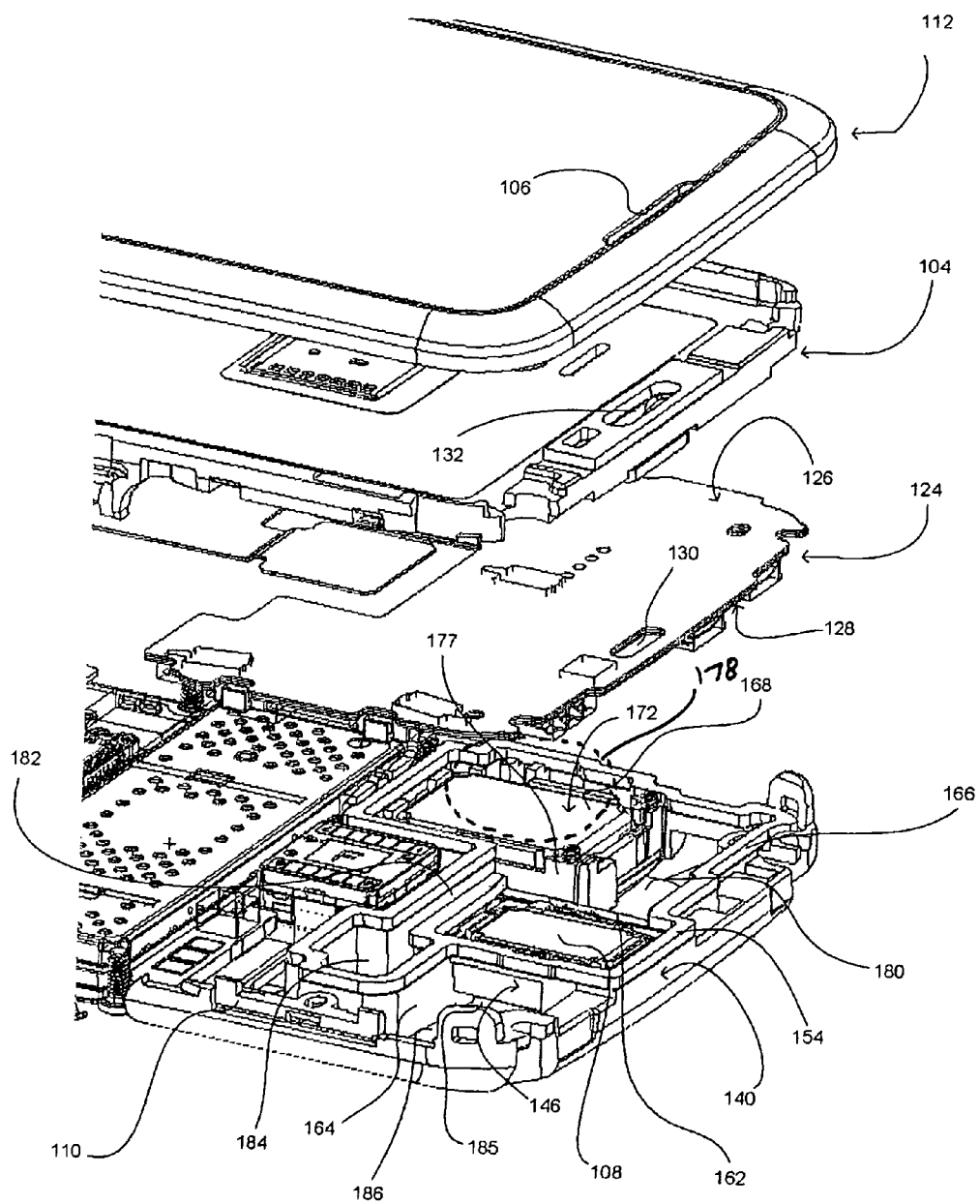
FIG. 1C is an expanded perspective view of a longitudinal end of the mobile terminal 10 of FIG. 1A.
Figure 1D:
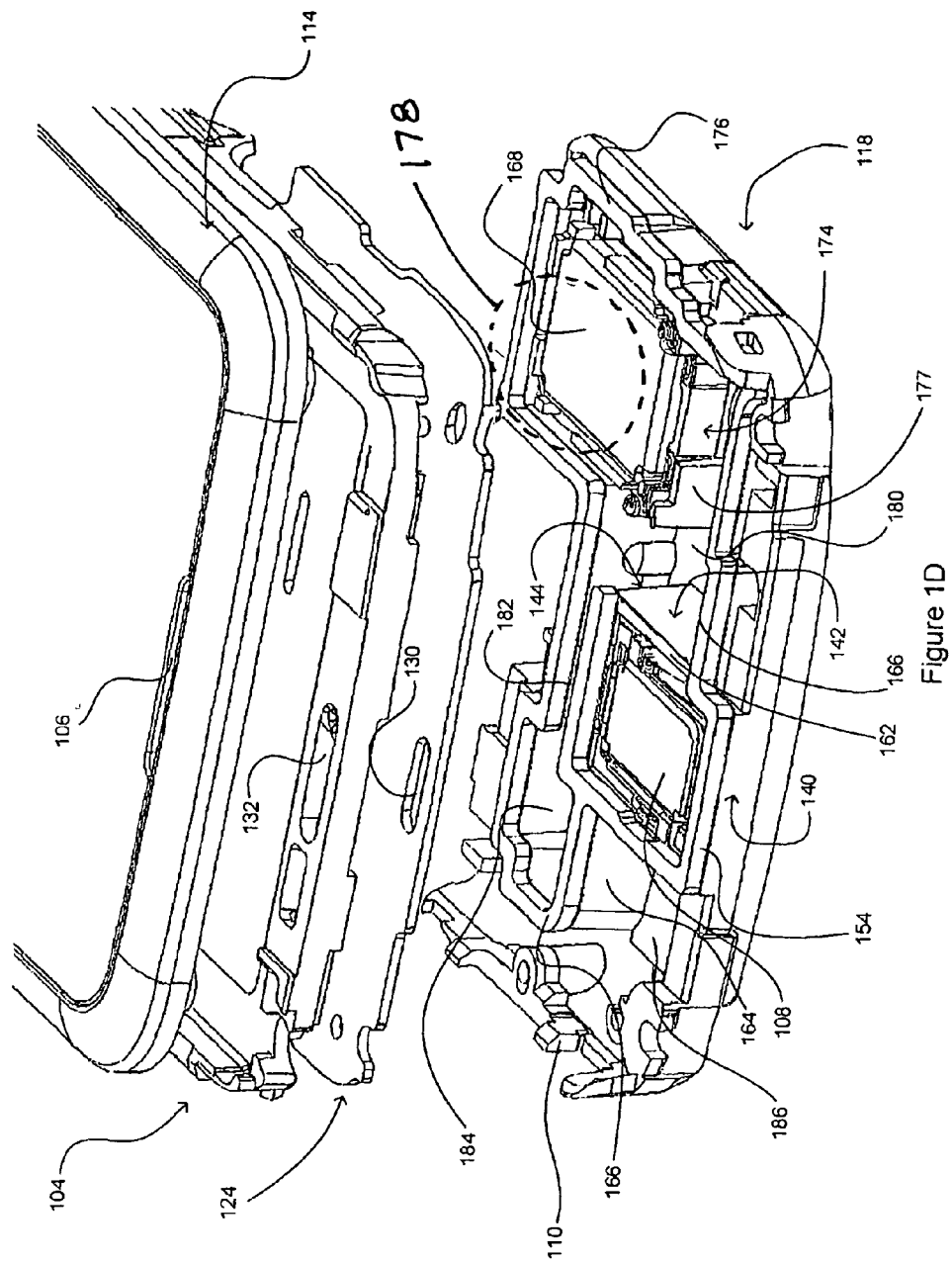
FIG. 1D is a rotated view of the second portion of the housing and the PWB shown in FIG. 1C.

FIG. 1B is a cross-sectional view through the mobile terminal 10 of FIG. 1A at the dashed line denoted "A". FIG. 1D is an expanded perspective view of a longitudinal end of the mobile terminal 10 of FIG. 1A. FIG. 1D is a rotated view of the second portion of the housing and the PWB 124 shown in FIG. 1C.

The outer cover 100 of the mobile terminal 10 comprises a first portion 112 and a second portion 118. The first portion 112, which will be referred to as the A-cover 112, comprises a face portion 114 which includes the display region 102 and the sound hole 106 and which constitutes the front surface of the mobile terminal 10. The first portion 112 also includes and side wall portions 116 extending substantially perpendicularly from the face portion 114. The second portion 118, which will be referred to as the B-cover 118, comprises a base portion 120, which constitutes the rear surface of the mobile terminal 10, and side wall portions 122 which extend substantially perpendicularly from the base portion 120. The side wall portions 116 of the A-cover 112 are configured to engage with the side wall portions 122 of the B-cover 118.

The display panel 104 is provided beneath the display region 102 of the A-cover 112. In this specification, the term "the display panel 104" is used to refer to a display component including an LCD, or other type, display panel 104 and its associated electronics. The display panel 104 also comprises a touch-sensitive panel (not shown) provided immediately adjacent to the display region 102 of the A-cover 112. It will be understood, that the mobile terminal 10 may include a keypad (not shown) instead of, or in addition to, the touch sensitive panel.

The mobile terminal 10 also comprises a printed wire board (PWB) 124. The PWB 124 is provided beneath the display panel 104. The PWB 124 comprises an upper surface 126 provided adjacent to the display panel 104. The upper surface 126 of the PWB 124 faces the display region 102 and the sound hole 106 of the A-cover 112. The PWB 124 also comprises a lower surface 128 oppositely disposed to the upper surface 126. The lower surface 128 of the PWB 124 faces generally towards the base portion 120 of the B-cover 118. The earpiece speaker module 108 is provided adjacent to the lower surface 128 of the PWB 124. The earpiece speaker module 108 is in electrical connection with electronic components via the lower surface 128 of the PWB 124. The earpiece speaker module 108 is provided with power and input signals via the PWB 124. The earpiece speaker module 108 is electrically connected to the PWB 124 via spring contacts or leaf contacts. Alternatively, the earpiece speaker module 108 may be electrically connected to the PWB 124 via a soldered connection or another suitable type of connection.

Figure 2:
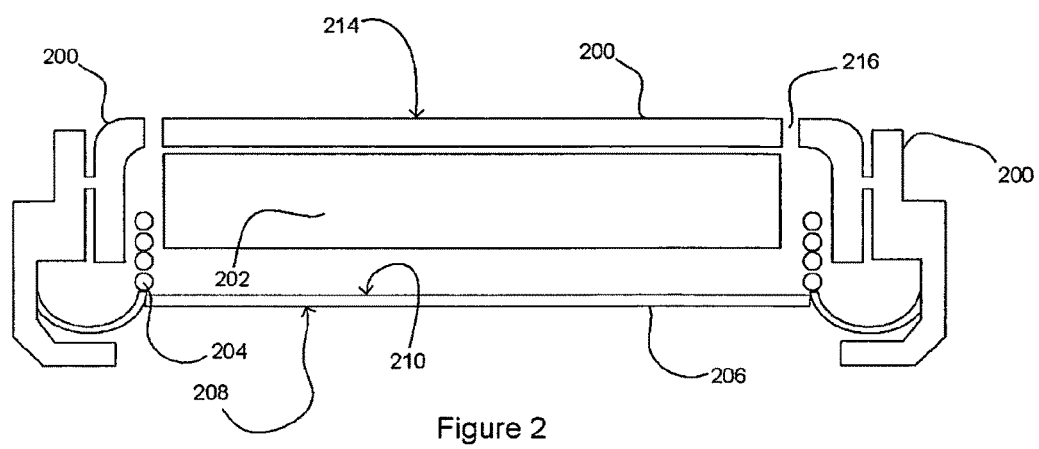
FIG. 2 is a cross-sectional view through the earpiece speaker module of FIGS. 1B to 1D according to example embodiments of the invention.

FIG. 2 is a cross-sectional view through the earpiece speaker module 108 according to example embodiments of the invention. The earpiece speaker module 108 comprises a moving coil transducer. The earpiece speaker module 108 comprises a speaker module housing 200, a magnet 202, a coil 204 and a diaphragm 206. The coil 204 and the diaphragm 206 are coupled together and are arranged relative to the magnet 202 such that, when an alternating current is applied through the coil 204, the coil 204 and thus also the diaphragm 206, is caused to oscillate. The diaphragm 206 comprises a front surface 208 and a back surface 210. The back surface of the diaphragm 206 faces substantially towards the earpiece speaker housing 200. The front of the diaphragm 206 faces substantially away from the earpiece speaker housing 200.

The surface 212 of the earpiece speaker module 108 towards which the front surface 208 of the diaphragm 206 faces, or which is constituted by the front surface 208 of the diaphragm 206, will hereafter be referred to as the front 212 of the earpiece speaker module 108. The surface 214 of the earpiece speaker module 108 towards which the back surface 210 of the diaphragm 206 faces will hereafter be referred to as the back 214 of the earpiece speaker module 108.

When the diaphragm 206 oscillates, sound waves propagate from both the front 212 and back 214 of the diaphragm 206. The earpiece speaker housing 200 includes a plurality of apertures 216 provided therein. It will be understood, however, that the earpiece speaker housing 200 may instead comprise a single aperture provided therein. Sound waves propagating from the back surface 210 of the diaphragm 206 pass through the apertures 216 in the earpiece speaker housing 200.

The construction of earpiece speaker modules, such as the earpiece speaker module 108 included in the mobile terminal of FIGS. 1A to 1D is well known. As such, it will be well understood that the earpiece speaker module 108 may also include additional structural or functional components, for example, a pole piece or additional housing elements. It will be understood also that the earpiece speaker module 108 may comprise a different type of speaker. For example, the earpiece speaker module 108 may comprise a piezo-speaker or an electrostatic speaker.

Referring back to FIGS. 1A to 1D, the earpiece speaker module 108 is provided within the housing 100 such that the back 214 of the earpiece speaker module 108 faces towards a lower, or second, surface 128 of the PWB 124. The front 212 of the earpiece speaker module 108 faces away from the PWB 124 and towards the base portion 120 of the B-cover 118.

The PWB 124 has an aperture 130 provided therethrough from the upper, or first, surface 126 to the lower surface 128. The aperture 130 is located in a portion of the PWB 124 adjacent to the back 214 of the earpiece speaker module 108.

The aperture 130 in the PWB 124 allows acoustic signals emanating from the back 214, or rear, of the earpiece speaker module 108 to pass through the PWB 124. The aperture 130 in the PWB 124 is substantially aligned with the sound hole 106 provided in face portion 114 of the A-cover 112. The display panel 104 also includes an aperture 132 provided therein. The aperture 132 provided in the display panel 104 is aligned with the aperture 130 provided in the PWB 124 and with the sound hole 106. The apertures 130, 132 formed in the PWB 124 and the display panel 104, and the sound hole 106 constitute an acoustic channel 134 between the rear 214 of the earpiece speaker module 108 and the exterior of the mobile terminal 10. As such, acoustic signals emanating from the back 214 of the earpiece speaker module 108 are audible to a user when the user places the sound hole 106 adjacent to their ear.

The earpiece speaker module 108 is mounted within an earpiece speaker enclosure 136. The earpiece speaker enclosure 136 encloses the earpiece speaker module 108 around its perimeter. The earpiece speaker enclosure 136 comprises first to fourth wall portions 140, 142, 144, 146. The first to third wall portions 140, 142, 144 extend from the base portion 120 of the B-cover 118. The fourth wall portion 146 is attached at either end to the first and third wall portions 140, 144. The fourth wall portion 146 is not coupled to the base portion 120 of the B-cover 118. Alternatively, the fourth wall portion 146 is coupled to the base portion and has a leak channel (not shown) formed there within. One of more of the walls of the earpiece speaker enclosure may be constituted by the side walls 122 of the B-cover 118.

The earpiece speaker enclosure 136 further comprises support portions 148 for supporting the earpiece speaker module 108 around a perimeter of its front surface 208. The support portions 148 support the earpiece speaker module 108 such that the front 212 of the earpiece speaker module 108 is disposed a predetermined distance above the base portion 120 of the B-cover 118. A front cavity 150 is provided between the front 212 of the earpiece speaker module 108 and the base portion 120. The size of the front cavity 150 is defined by, at least, an area of the base portion 120 of the B-cover 118 enclosed by the wall portions 140, 142, 144, 146 of the earpiece speaker enclosure 136 and the distance between the base portion 120 and the front 212 of the earpiece speaker module 108. The front 212 of the earpiece speaker module 108 is in sealed connection with the support portions 148 around its entire perimeter. Consequently, air is unable to flow directly from the front cavity 150 to a rear volume 152 provided adjacent to the back 214 of the earpiece speaker module 108.

It will be understood that the earpiece speaker enclosure may take any suitable configuration. A suitable configuration includes configurations wherein the front 212 of the earpiece speaker module 108 is supported a distance from the base portion 120 and wherein there is a good seal such that air is prevented from flowing from a volume adjacent the front 212 of the earpiece speaker module 108 to a rear volume 152 provided adjacent the back 214 of the earpiece speaker module 108.

A gasket 154 is provided around the top of the wall portions 140, 142, 144, 146 of the earpiece speaker enclosure 136. The PWB 124 is provided atop the gasket 154. The gasket provides a seal between the wall portions 140, 142, 144, 146 of the earpiece speaker enclosure 136 and the PWB 124.

A combined height of the earpiece speaker enclosure 136 and the gasket 154 is greater than a combined height of the support portions 148 and the earpiece speaker module 108.

The rear volume 152 is formed between the rear 214 of the earpiece speaker module 108 and the lower surface 128 of the PWB 124.

An additional acoustic cavity 160 is provided adjacent to the earpiece speaker enclosure 136. The additional acoustic cavity 160 is coupled with the rear volume 152 via a channel 162 provided in a portion of the gasket 154 atop the second wall portion 142 of the earpiece speaker enclosure 136. The channel 162 between the earpiece speaker enclosure 136 and the additional acoustic cavity 160 may instead be formed by providing an aperture in the second wall 142 of the earpiece speaker enclosure 136 so as to couple the rear volume 152 with the additional acoustic cavity 160.

A shape of the additional acoustic cavity 160 is defined by a additional acoustic cavity wall 164 extending from the base portion 120 of the B-cover 118. The additional acoustic cavity wall 164 encloses an area of the base portion 120 of the B-cover 118. A portion of the additional acoustic cavity wall 164 may be constituted by the side walls 122 of the B-cover 188.

An additional acoustic cavity gasket 166 is provided atop the additional acoustic cavity wall 164. The additional acoustic cavity gasket 166 is integrally formed with the earpiece speaker gasket 154. The PWB 124 is configured to cover both the earpiece speaker enclosure 136 and the additional acoustic cavity 160. The additional acoustic cavity gasket 166 forms a sealed connection between the PWB 124 and the additional acoustic cavity wall 164. Consequently, air is only able to enter the additional acoustic cavity 160 via the channel 162 provided in a portion of the gasket 154 atop the second wall portion 142 of the earpiece speaker enclosure 136. As such, the additional acoustic cavity 160 may be known as "sealed acoustic cavity".

As the additional acoustic cavity 160 is disposed along side the earpiece speaker module, and not directly behind it, the cavity 160 may instead be termed a "side cavity". The provision of the acoustic cavity 160 to the side, or sides, of a speaker, is sometimes known as "side-firing".

The additional acoustic cavity 160 is shared by a "hands-free" loudspeaker (HF speaker) 168. In many mobile terminal designs, at least one HF speaker is provided in a half of the phone near to the earpiece speaker module 108. As such, it is possible to save space within the mobile terminal by sharing the additional acoustic cavity 160 between the earpiece speaker module 108 and the HF speaker 168. However, it will be understood that the additional acoustic cavity 160 may be dedicated for sole use by the earpiece speaker module 108, whether or not an HF speaker 168 is in close proximity to the earpiece speaker module.

The HF speaker 168 comprises a front (not shown) and a back 172. As with the earpiece speaker module 108, the front and back 172 of the HF speaker 168 are defined with reference to a diaphragm, or other air moving component, of the HF speaker 168. The front of the HF speaker 168 is engaged with an HF sound hole (not shown) provided in the base portion 120 of the B-cover 118. The rear 172 of the HF speaker 168 faces toward the PWB 124. The HF speaker 168 is provided within an HF enclosure 174 which encloses a perimeter of the HF speaker 168. An HF speaker gasket 176 is provided atop walls 177 of the HF speaker enclosure 174. The HF speaker gasket 176 provides a sealed connection between the walls of the HF speaker enclosure 174 and the lower surface 128 of the PWB 124.

An HF rear volume 178 is provided between the back 172 of the HF speaker 168 and the lower surface 128 of the PWB 124. The HF rear volume 178 is coupled to the additional acoustic cavity 160 by airways provided above and around portions of the walls 177 of the HF speaker enclosure 174.

The additional acoustic cavity 160 comprises first, second and third sections 180, 182, 184. The rear volumes of the earpiece and HF speakers 152, 178 are coupled to the first section 180 of the acoustic cavity 160. The second section 182 extends from the first section 180. The second section 182 has a main axis parallel to and adjacent to the third wall portion 144 of the earpiece speaker enclosure 136. The third section 184 extends from an end of the second section 184.

The provision of the gaskets 154, 166, 176 within the mobile terminal provides sealed connections around the peripheries of the rear volumes 152, 178 of the earpiece and HF speakers and of the additional acoustic cavity 160. Also, the earpiece speaker module 108 is in sealed connection around its perimeter with the support portions of its enclosure. The sealed connection with the support portions may be achieved by providing an additional gasket (not shown) between the perimeter of the front of the speaker and the support portions. Similarly, the front of the HF speaker is in sealed connection with the edges of the HF speaker aperture (not shown). The additional acoustic cavity 160 is sealed from the exterior of the mobile terminal, except via the acoustic channel 134 formed by the sound hole 106 in the A-cover 112 and the apertures 130, 132 in the PWB 124 and the display panel 104.

It will be understood that the additional acoustic cavity may, in practice, comprise a low level of leakage, for example via the HF aperture (not shown). As such, the additional acoustic cavity may be substantially sealed, but not completely sealed.

The front cavity 150 is coupled to an interior volume 186 of the mobile terminal via the leak channel 185 provided between the base portion of the B-cover and the fourth wall portion 146 of the earpiece speaker enclosure 136. The leak channel 185 may comprise an aperture in the fourth wall portion 146, instead of a channel beneath the fourth wall portion 146. The leak channel 185 may be significantly less extensive than (i.e. be smaller than) that shown in the Figure.

The front cavity 150, and thus also the interior volume 186 of the mobile device, is hermetically isolated from the additional acoustic cavity 160. The parameters (i.e. the dimensions etc) of the leak channel 185 are controlled. As is discussed below, the size and leakage of the leak channel 185 may affect the frequency response of the acoustic system.

The interior volume 186 of the mobile terminal may include a leak 188 to the exterior of the mobile terminal 10. The leak 188 is provided, for example, around the volume control button which is located in the side wall 122 of the B-cover 118. It will be understood that the interior volume 186 houses additional internal components (not shown) of the mobile device.

The provision of the earpiece speaker module 108 adjacent to the lower surface 128 of the PWB 124, instead of adjacent the upper surface 126 of the PWB 124, allows a display panel of increased size, compared to a corresponding arrangement in which an earpiece module is located above a PWB, to be incorporated into the mobile terminal. Furthermore, because the earpiece speaker module 108 does not impinge on the display panel 104, an earpiece speaker module 108 of increased size, compared to a corresponding arrangement in which an earpiece module is located above a PWB, may also be utilised. Generally, a larger earpiece speaker module 108 provides an improved quality of sound. The provision of the earpiece speaker module 108 adjacent the lower surface 128 of the PWB 124 is beneficial in that it allows the head-length of the mobile phone not to be dictated by the size of the earpiece speaker module 108. The head-length is a region of a mobile terminal bounded by an edge of the display screen and a longitudinal end of the terminal.

The provision of the earpiece speaker module 108 adjacent to the lower surface 128 of the PWB 124 allows the earpiece speaker module to be situated within a customised enclosure integrally formed with the B-cover. This provides improved mechanical reliability and robustness, and thus also a reduced probability of faults occurring with the earpiece speaker module 108. Furthermore, the provision of the earpiece speaker module 108 at an increased distance from the sound hole 106 provides increased protection against the contamination and degradation of the earpiece speaker module 108 due to dust and water entering the mobile terminal through the sound hole. Also, the provision of the earpiece speaker module 108 within the enclosure 136 provided in the B-cover 118 allows a more flexible and easier sub-assembly of the mobile terminal 108, and also an opportunity for the earpiece speaker module to be tested in situ within the B-cover prior to full assembly of the mobile terminal 10.

Figure 3:
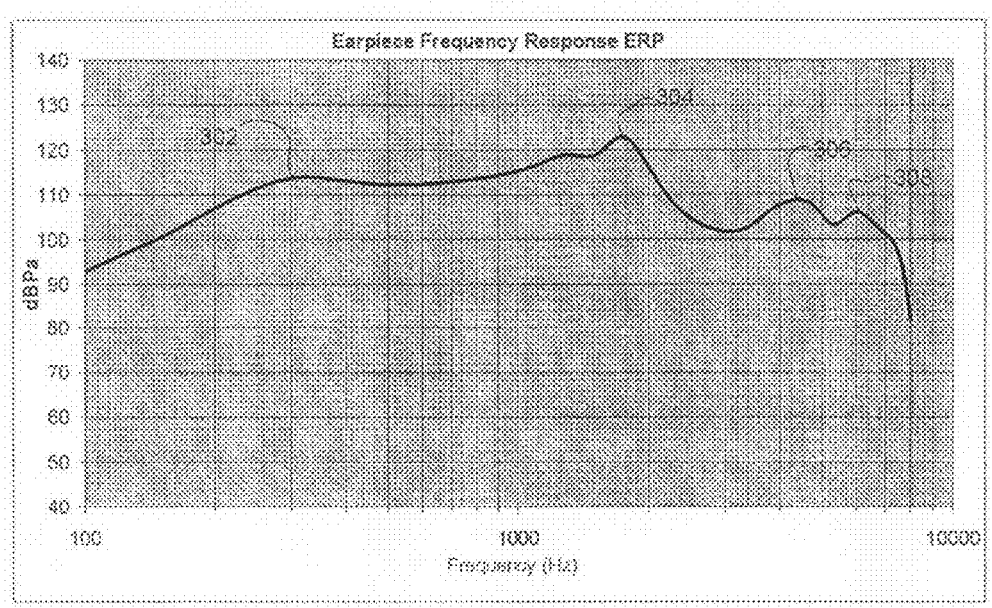
FIG. 3 is a graph showing the frequency response of an example embodiment of the present invention.

Acoustic arrangements according to various example embodiments of the invention provide a wideband frequency response. The frequency response of the example embodiment depicted in FIGS. 1A to 1D is shown in FIG. 3.

A first peak 302 of the frequency response, at about 300 Hertz, is due to the acoustic resonance of the earpiece speaker module 108. The provision of the leak channel 185 from the front cavity 150 may act to smooth the frequency response curve, when compared to a frequency response curve of an acoustic system in which the front cavity is sealed. The parameters of the leak channel 185 may be chosen so as to obtain a suitable frequency. Also, a higher leakage through the leak channel 185 results in less damping of oscillation at the frequency of the first peak 310. As such, the amplitude at this frequency, and nearby frequencies, is increased with higher leakage of the leak channel 185. The characteristics of the leak may be selected so as to provide a suitable degree of smoothing and to prevent a reduction in sensitivity as a result of damping.

A second peak 304 in the frequency response graph, which is at around 1.8 kHz, results from the resonance of a high leakage volume formed around the sound hole by a high leak coupler used when measuring the frequency response of the acoustic system. The second resonance peak would be present also if a frequency response was measured using a low leak coupler. However, if a sealed coupler were used to perform the measurement, the second peak may not be present at all. In use, it is unlikely that a perfect seal will be formed around the sound hole by a user's ear. As such, the leakage of the volume formed between an external area of the A-cover around the sound hole 106 and the user's ear may be similar to that of a high or low leak coupler. The frequency of the resonance of this volume depends on the leakage of the volume.

The third peak 306 in the frequency response is at around 4.5 kHz. This peak is due to the Helmholtz resonance of air volume formed by a combination of the rear volume 152 and the acoustic channel 134, as can be seen clearly in FIG. 1B.

The fourth peak 308, at approximately 6 kHz, is influenced by the provision of the additional acoustic cavity 160 coupled via the coupling channel 162 to the rear volume 152. The presence of the fourth resonance peak 308 results in a broader relatively flat wideband frequency response than would be provided by a system that did not comprise the additional acoustic cavity 160.

The provision of a relatively flat wideband frequency response reduces the requirement for digital signal processing of the signal input to the earpiece speaker module. This reduces the overall amount of processing performed by the mobile terminal and thus also reduces the amount of power used by the mobile terminal. Indeed, digital signal processing may be avoided altogether, contrary to current design convention.

It will be understood from the above that the frequency response generated depends on the parameters of the acoustic system. The frequency response may be tuned as required by altering parameters of the various parts of the system including, for example, the volume of the additional acoustic cavity 160, the volume of the front cavity 150, the dimensions of the leak channel 185, the dimensions of the rear volume 152 of the earpiece speaker module 108 and the dimensions of the coupling channel between the rear volume 152 and the additional acoustic cavity 160. Also, the integration between the different parts of the acoustic system, as well as the shapes of the various apertures, and the materials used affect the generated frequency response.

The frequency response of FIG. 3 was generated by an acoustic system having the following measurements:

Rear volume 152 of the earpiece speaker module: Length=9 mm, Width=6 mm, Height=0.15 mm;

First section 180 of additional acoustic cavity: Volume≈610 nm$^3$;

Second section 182 of additional acoustic cavity: Length=10 mm; Width=2.6 mm; Height=5 mm;

Third section 184 of additional acoustic cavity: Length=7 mm; Width=6.6 mm; Height=5 mm;

Coupling channel between rear volume 152 and additional acoustic cavity: Length=0.8 mm; Width=10 mm; Height=0.7 mm;

The skilled person will understand that these are exemplary measurements only and that acoustic systems having alternative measurements are not excluded by the invention.

According to other exemplary embodiments, the distance between the rear 214 of the earpiece speaker module 108 and the lower surface 128 of the PWB 124 may be increased. This serves to increase the rear volume 152. In such embodiments, the measured fourth peak 308 may be of larger magnitude than that seen in FIG. 3. The increase in distance between the earpiece speaker module 108 and the lower surface 128 of the PWB may render unsuitable the use of spring or leaf contacts for providing the electrical connection with the PWB. As such, in such embodiments, the electrical contacts between the lower surface 128 of the PWB 124 and the rear 214 of the earpiece speaker module 108 may be provided by a soldered connection. This increases the mechanical reliability and robustness of the acoustic system. Alternatively, the PWB may have an additional flexible component for coupling with the spring or leaf contacts of the earpiece speaker module so as to provide an electrical interface with the earpiece speaker module 108. Alternatively, the PWB may comprise a raised portion or portions with which the spring or leaf contacts may be in electrical connection.

It will be understood that the shape and location of the additional acoustic cavity 160 may be selected based on the requirements of the designer of the mobile terminal 10. For example, the shape and location of the additional acoustic cavity 160 may be chosen so as to fit around the locations of other internal components (not shown) of the mobile terminal. According to alternative exemplary embodiments, the additional acoustic cavity 160 may be provided above the PWB 124. According to other alternative embodiments, the additional acoustic cavity 160 may comprise a first portion below the PWB 124 and a second portion above the PWB 124. The first and second portions may be coupled by a cavity aperture provided in the PWB 124. The cavity aperture is separate from the aperture 130 which constitutes part of the acoustic channel 134.

According to other alternative example embodiments, the mobile terminal may comprise a dedicated additional acoustic cavity that is not shared with another speaker module. It will be appreciated that exemplary embodiments described prior to this paragraph may be adapted to include a dedicated additional acoustic cavity that is not shared with another speaker module.

The embodiment described with reference to FIGS. 1 to 3 is not leak tolerant. However, according to alternative embodiments, additional sound holes may be provided on the A-cover near to the main sound hole 106. This may result in a leak tolerant acoustic system. Also, according to some alternative embodiments, the acoustic system may comprise a bass reflex port. When a bass reflex port is present, no leakage from the front cavity 150 like the leak 185 in FIG. 1B can be present.

According to alternative embodiments, the front cavity may be constituted by both the front cavity 150 and the interior 186 of the mobile device. In such embodiments, the parameters of the interior 186 of the mobile device and the leak 188 provided therein may be selected dependent on the required acoustic frequency response.

Although air is described as being the fluid present within the arrangements of the embodiments it will be appreciated that other fluids may be used instead.

It should be realised that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. An apparatus, comprising:
   a housing comprising an earpiece aperture for radiating sound to a user's ear when the apparatus is located adjacent the user's ear;
   a substrate provided within the housing and comprising a first surface oppositely disposed to a second surface, wherein the first surface of the substrate faces generally towards the earpiece aperture;
   an earpiece speaker module provided within the housing and comprising an air displacement component that is configured to move upon application of an electrical signal for providing sound, the earpiece speaker module having a front surface and a back surface wherein sound waves propagate from both surfaces, wherein the back surface of the earpiece speaker module faces the second surface of the substrate;
   an acoustic cavity defined within the housing, the acoustic cavity being connected to the earpiece aperture, wherein the acoustic cavity is coupled via a coupling channel to a rear volume between the second surface of the substrate and the back surface of the earpiece speaker module;
   a front volume adjacent the front surface of the earpiece speaker module and coupled to an interior of the housing via a second coupling channel, wherein the rear volume and the acoustic cavity are isolated from the front volume; and
   wherein the earpiece aperture is acoustically coupled to the rear volume by an acoustic channel formed between the rear volume and the earpiece aperture for radiating sound to the user's ear when the sound is generated by the earpiece speaker module; and
   wherein the substrate comprises a printed wire board, and wherein the earpiece speaker module is electrically coupled to the printed wire board;
   wherein the apparatus comprises a display panel comprising a display surface and a back surface, and wherein the back surface of the display panel faces the first surface of the substrate; and
   wherein the coupling of the acoustic cavity to the rear volume is used to control at least one parameter that affects a frequency response of the apparatus.

2. The apparatus of claim 1, wherein the acoustic cavity and the rear volume are substantially sealed.

3. The apparatus of claim 1, wherein the housing comprises a first portion and a second portion, wherein the earpiece aperture is provided in the first portion, and wherein the second surface of the substrate faces the second portion of the housing.

4. The apparatus of claim 3, wherein an earpiece speaker enclosure is provided on the second portion of the housing and wherein the earpiece speaker module is mounted within the earpiece speaker enclosure.

5. The apparatus of claim 4, wherein the earpiece speaker enclosure comprises a plurality of wall portions extending from an interior surface of the second portion of the housing, and wherein the plurality of wall portions enclose a perimeter of the air displacement component.

6. The apparatus of claim 5, wherein the apparatus comprises a seal gasket provided between upper ends of the wall portions and the substrate, and wherein the coupling channel comprises an aperture in the seal gasket.

7. The apparatus of claim 5 wherein the front volume is coupled to the interior of the housing via a second coupling channel, and wherein the second coupling channel comprises an aperture provided in one of the plurality of wall portions.

8. The apparatus of claim 4, wherein the earpiece speaker enclosure comprises support members configured to support the earpiece speaker module a distance from the second portion of the housing, thereby defining the front volume between a front surface of the air displacement component and the second portion of the housing.

9. The apparatus of claim 1, further comprising a second earpiece speaker module wherein a third volume is provided adjacent the second earpiece speaker module and wherein the third volume is coupled to the acoustic cavity.

10. The apparatus of claim 1, wherein the apparatus is a mobile telecommunications device.

11. A method comprising:
   providing a housing comprising an earpiece aperture for radiating sound to a user's ear when an apparatus is located adjacent the user's ear;
   providing an earpiece speaker module within the housing and comprising an air displacement component that is configured to move upon application of an electrical signal for providing sound, the earpiece speaker module having a front surface and a back surface, within the housing, wherein sound waves propagate from both surfaces for providing the sound as acoustic signals to the user's ear when the earpiece speaker module is located adjacent the user's ear, and wherein the earpiece aperture is coupled to the earpiece speaker module by an acoustic channel between the back surface of the earpiece speaker module and the earpiece aperture;

providing a front volume adjacent the front surface of the earpiece speaker module and coupled to an interior of the housing via a coupling channel;

providing a substrate, comprising a first surface oppositely disposed to a second surface, within the housing such that the first surface of the substrate faces generally towards the earpiece aperture, such that the second surface of the substrate faces the back surface of the earpiece speaker module, and such that a rear volume is provided between the second surface of the substrate and the back surface of the earpiece speaker module;

defining an acoustic cavity within the housing, the acoustic cavity being connected to the earpiece aperture, wherein the rear volume and the acoustic cavity are isolated from the front volume, and wherein the earpiece aperture is acoustically coupled to the rear volume by an acoustic channel formed between the rear volume and the earpiece aperture for radiating sound to the user's ear when the sound is generated by the earpiece speaker module;

providing a second coupling channel to couple the acoustic cavity to the rear volume; and isolating the rear volume and the acoustic cavity from the front volume;

wherein the substrate comprises a printed wire board, and further comprising electrically coupling the earpiece speaker module to the printed wire board;

wherein the apparatus comprises a display panel comprising a display surface and a back surface, and wherein the back surface of the display panel faces the first surface of the substrate; and wherein the coupling of the acoustic cavity to the rear volume is used to control at least one parameter that affects a frequency response of the apparatus.

12. The apparatus of claim 1, wherein the acoustic channel is defined between the earpiece aperture for radiating sound to the user's ear when the sound is generated by the earpiece speaker module and at least one aperture in the substrate.

13. The apparatus of claim 1, wherein the substrate comprises at least one aperture.

* * * * *